(12) United States Patent
Pruvost

(10) Patent No.: US 11,577,263 B2
(45) Date of Patent: Feb. 14, 2023

(54) FASTENING SYSTEM FOR A DISTRIBUTION MEMBER ON A THREADED NECK OF A RESERVOIR

(71) Applicant: SILGAN DISPENSING SYSTEMS LE TREPORT, Le Treport (FR)

(72) Inventor: Thomas Pruvost, Saint Quentin la Motte (FR)

(73) Assignee: SILGAN DISPENSING SYSTEM LE TREPORT

( * ) Notice: Subject to any disclaimer, the term of this patent is extended or adjusted under 35 U.S.C. 154(b) by 0 days.

(21) Appl. No.: 16/911,383

(22) Filed: Jun. 24, 2020

(65) Prior Publication Data

US 2020/0398294 A1    Dec. 24, 2020

(30) Foreign Application Priority Data

Jun. 24, 2019 (FR) .................................. 1906778

(51) Int. Cl.
   *B05B 11/00*     (2006.01)
   *B29C 45/00*    (2006.01)
   *B29C 45/44*    (2006.01)
   *B29L 31/00*    (2006.01)

(52) U.S. Cl.
   CPC ...... *B05B 11/0008* (2013.01); *B29C 45/0081* (2013.01); *B29C 45/4407* (2013.01); *B29C 2045/4414* (2013.01); *B29L 2031/7096* (2013.01); *B29L 2031/7496* (2013.01)

(58) Field of Classification Search
   CPC ............ B05B 11/0008; B05B 11/3049; B29C 45/0081; B29C 45/4407; B29C 2045/4414; B29L 2031/7096; B29L 2031/7496

USPC ......................................................... 222/401
See application file for complete search history.

(56) References Cited

U.S. PATENT DOCUMENTS

| 5,085,332 A * | 2/1992 | Gettig ................ B65D 55/0872 215/277 |
| 5,348,174 A * | 9/1994 | Velicka ................. B65D 83/38 220/915 |
| 6,619,495 B1 * | 9/2003 | Pares ..................... B65D 41/10 215/280 |
| 2009/0001103 A1 | 1/2009 | Wanbaugh |
| 2009/0283549 A1 | 11/2009 | Beranger |

(Continued)

FOREIGN PATENT DOCUMENTS

| EP | 2135682 | 12/2009 |
| JP | H09276758 | 10/1997 |
| WO | WO2020212663 | 10/2020 |

*Primary Examiner* — Vishal Pancholi

(57) ABSTRACT

A fastening system for fastening a distribution member, such as a pump, on a neck of a reservoir to form a distributor for a fluid product includes a fastening ring and a rigid collar, the ring including a skirt intended to be engaged around the neck. The skirt includes articulated fastening tabs angled outwards with respect to a central axis X of the ring, and the collar is able to be moved with respect to the skirt and engaged around the skirt so as to fold back the articulated tabs to a radial alignment with the axis X. The ring with the collar is then able to be assembled on the neck and able to be disassembled from the neck without relative movement between the ring and the collar, and the articulated tabs have an internal fastening means that can engage with an external fastening means of the neck

18 Claims, 10 Drawing Sheets

(56) References Cited

U.S. PATENT DOCUMENTS

| | | | | |
|---|---|---|---|---|
| 2011/0024465 A1* | 2/2011 | Roosel | ............... | B05B 11/3049 |
| | | | | 222/321.1 |
| 2012/0285991 A1* | 11/2012 | Muller | .................... | B05B 15/00 |
| | | | | 222/113 |
| 2012/0318825 A1* | 12/2012 | Beranger | ............ | B05B 11/3049 |
| | | | | 222/321.1 |
| 2013/0118641 A1* | 5/2013 | Beranger | .............. | B05B 11/001 |
| | | | | 141/383 |

* cited by examiner

[Fig.1]
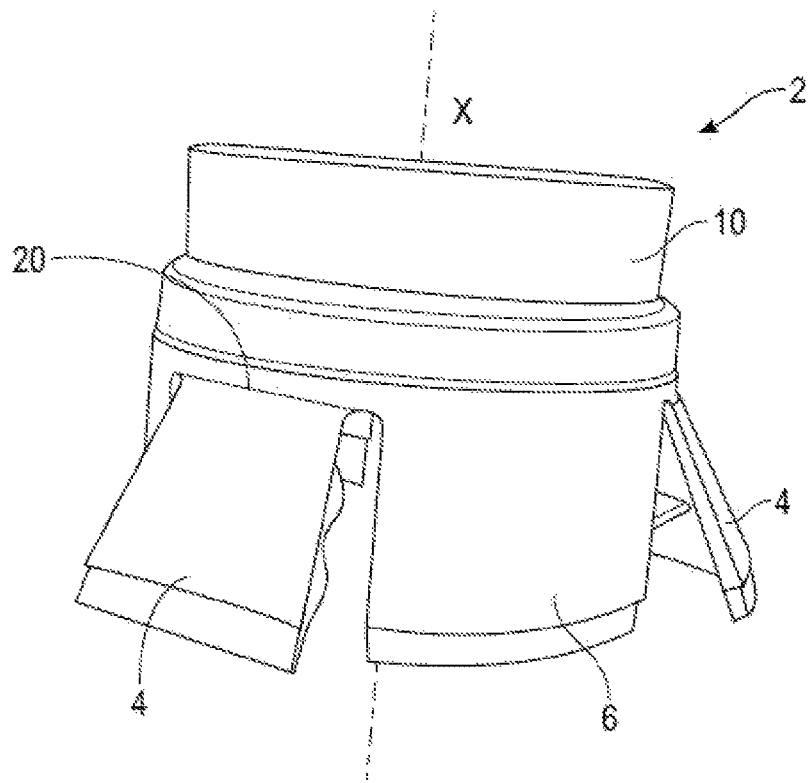
[Fig.2]
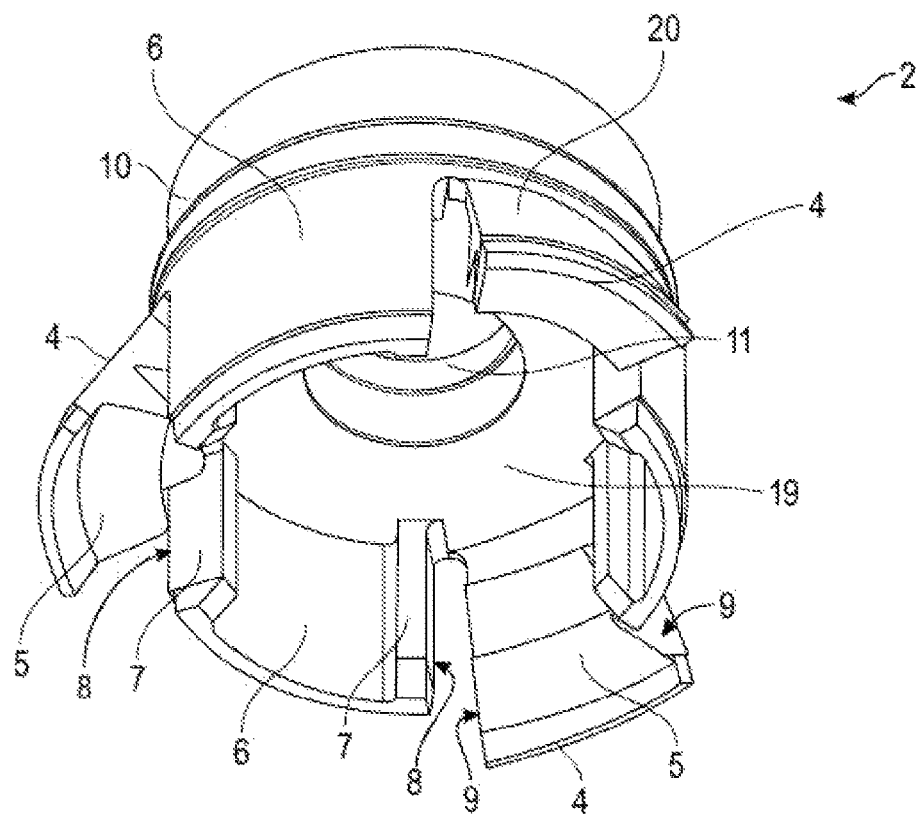

[Fig.3]
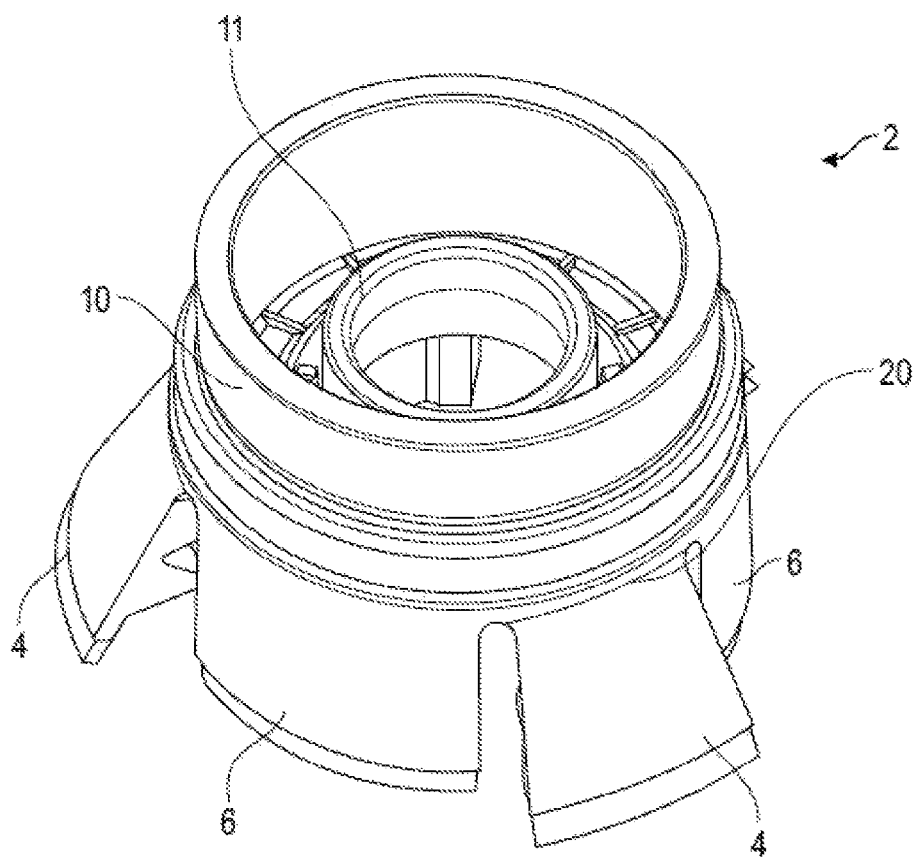

[Fig.4]
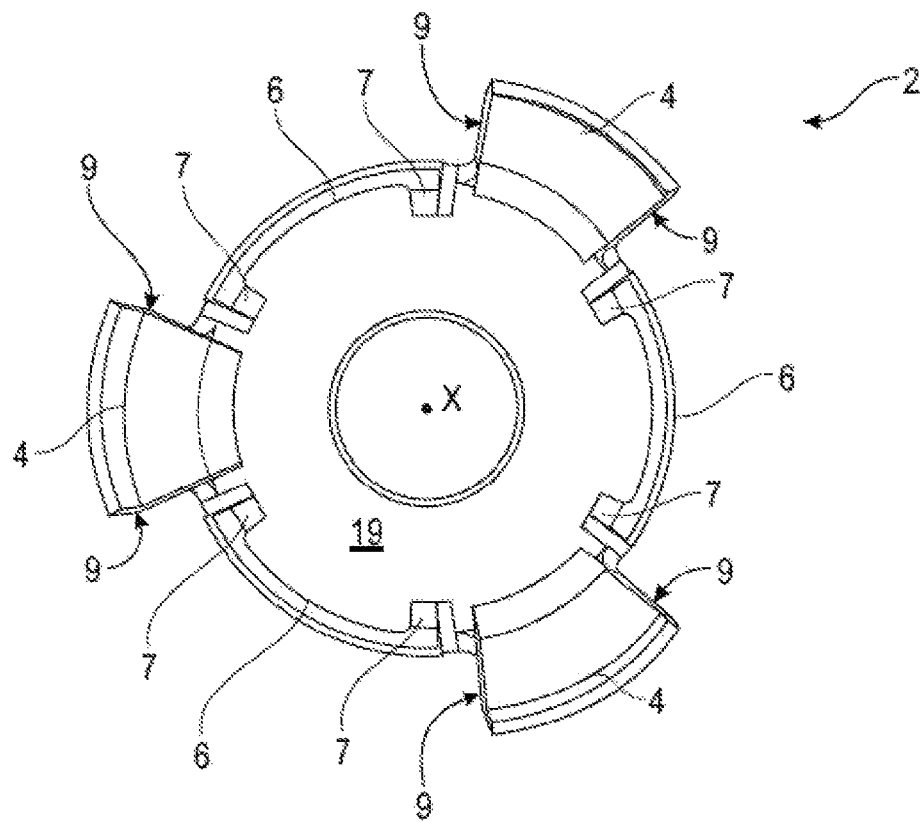
[Fig.5]
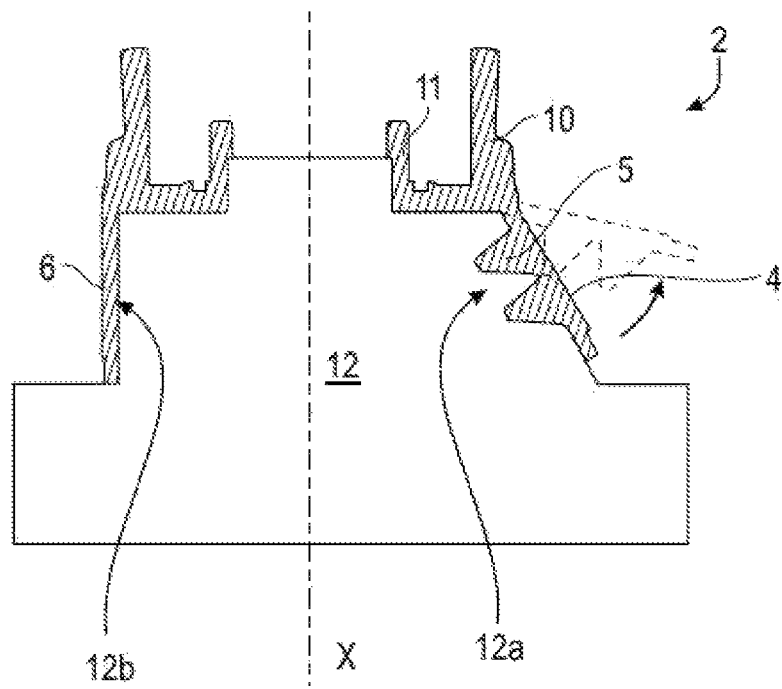

[Fig.6]
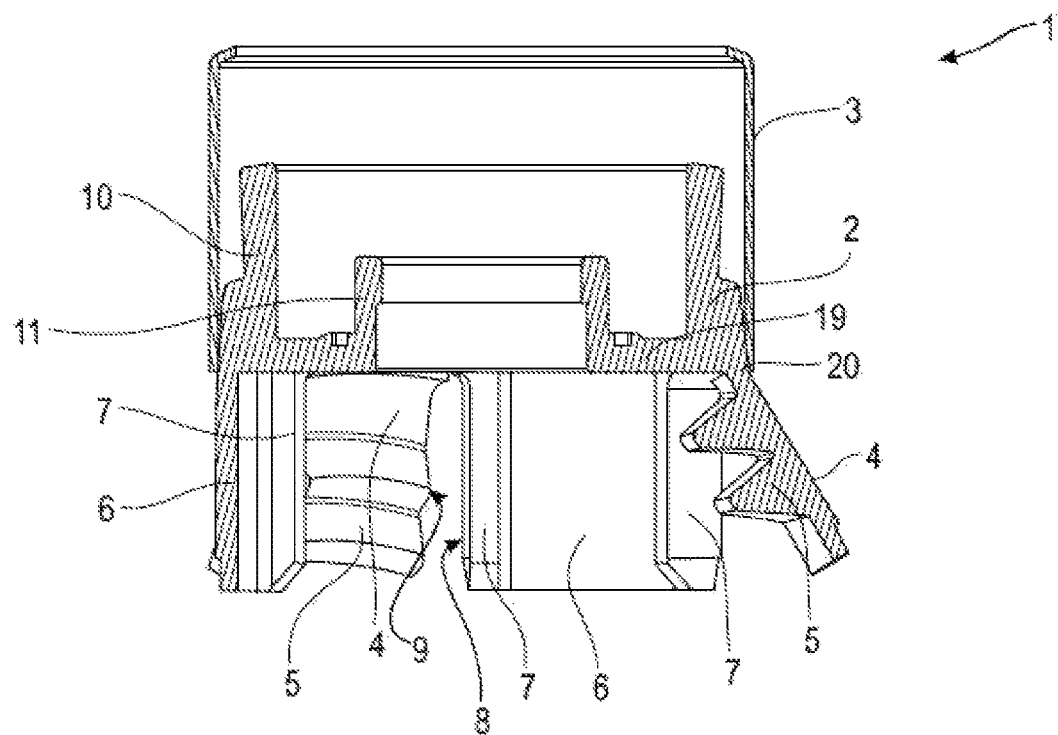
[Fig.7]
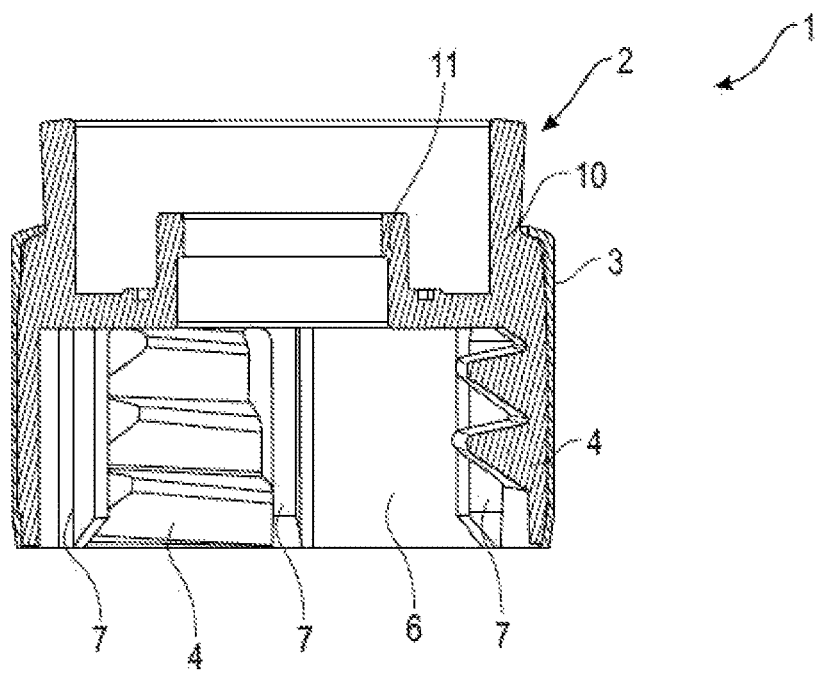

[Fig.8]
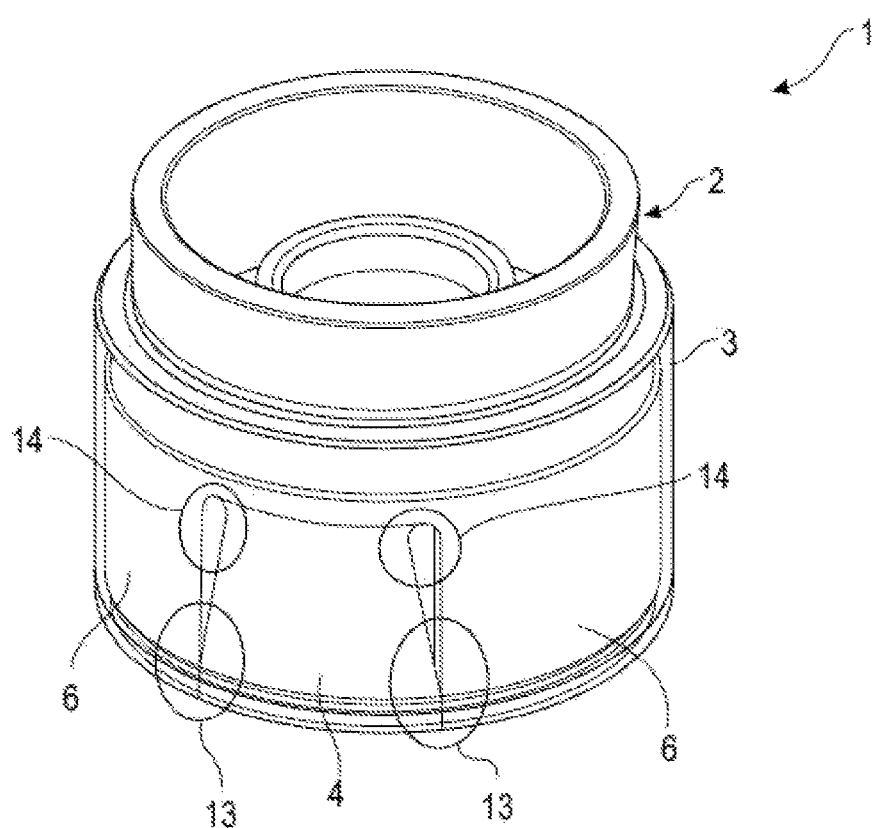

[Fig.9]
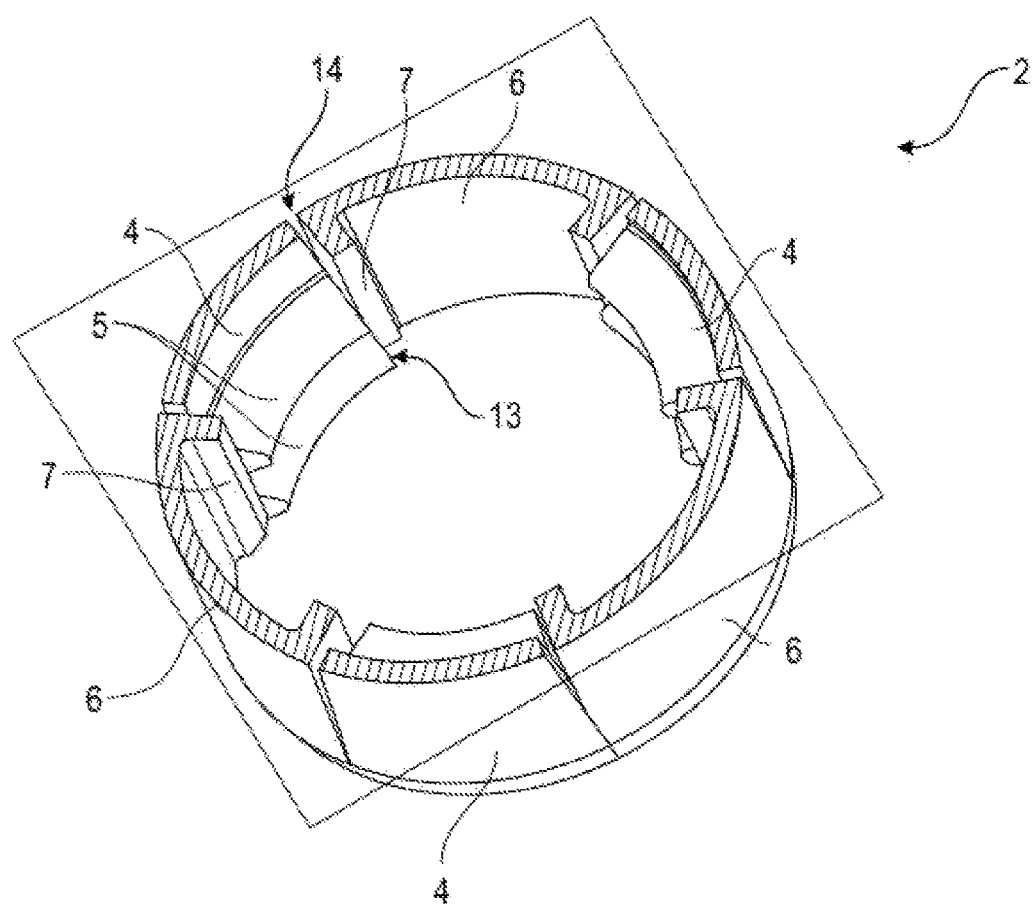
[Fig.10a]
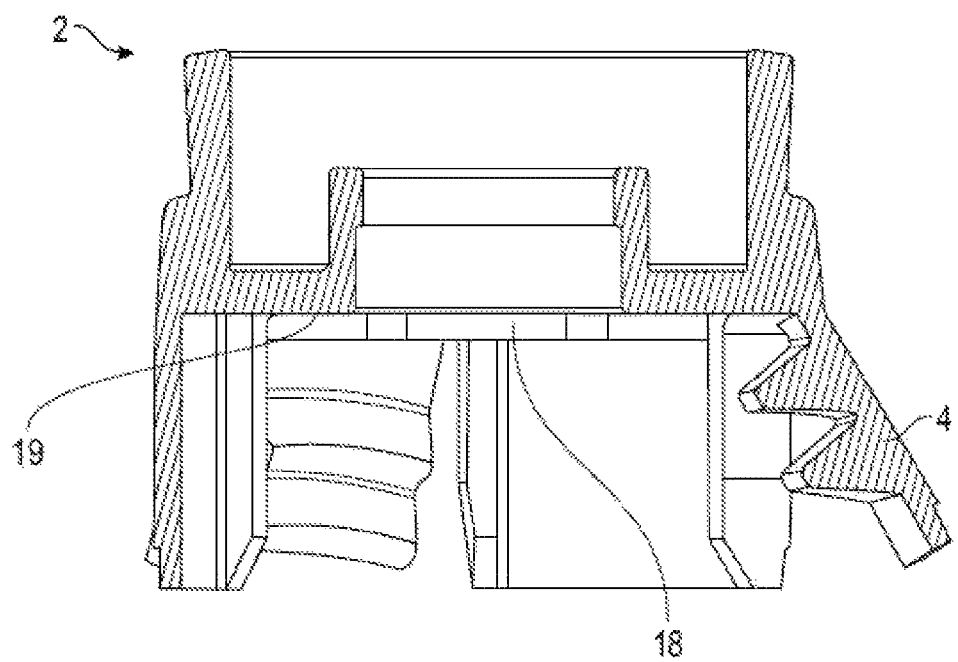

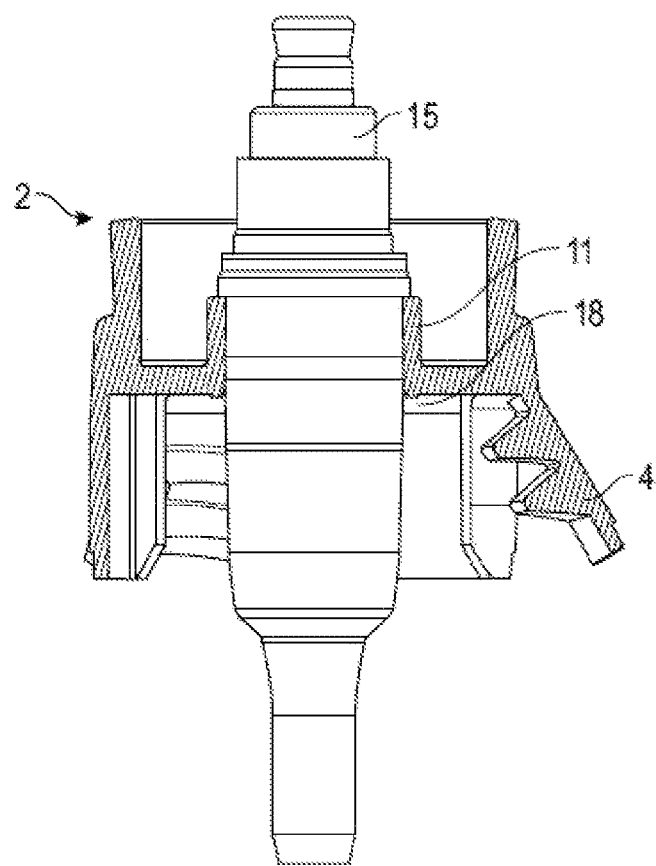
[Fig.10b]

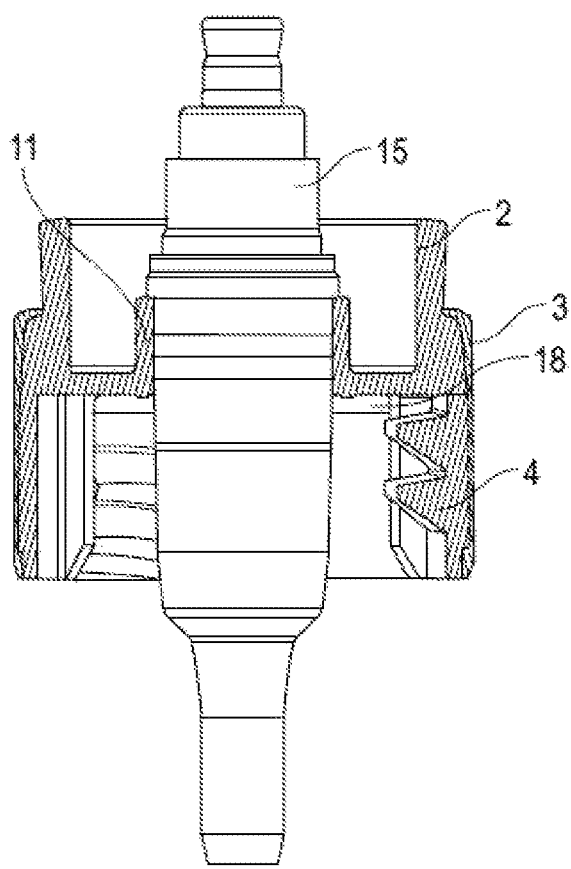
[Fig.10c]

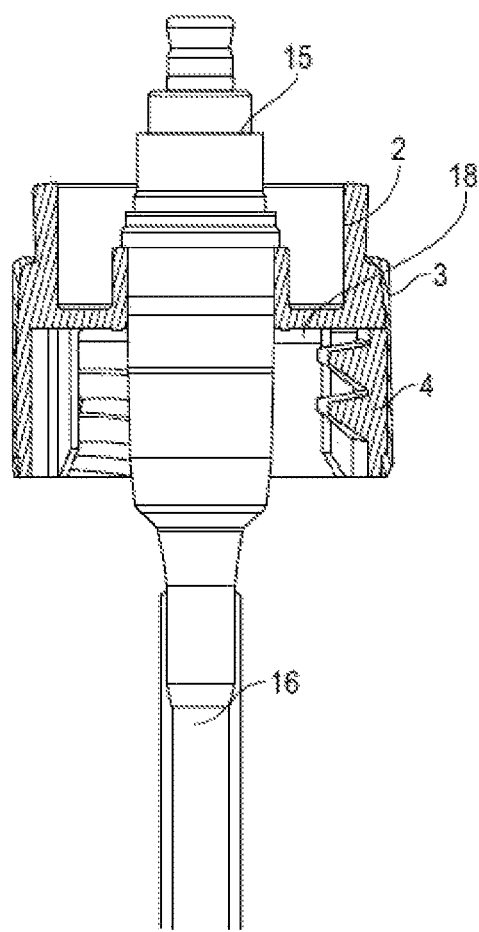
[Fig.10d]

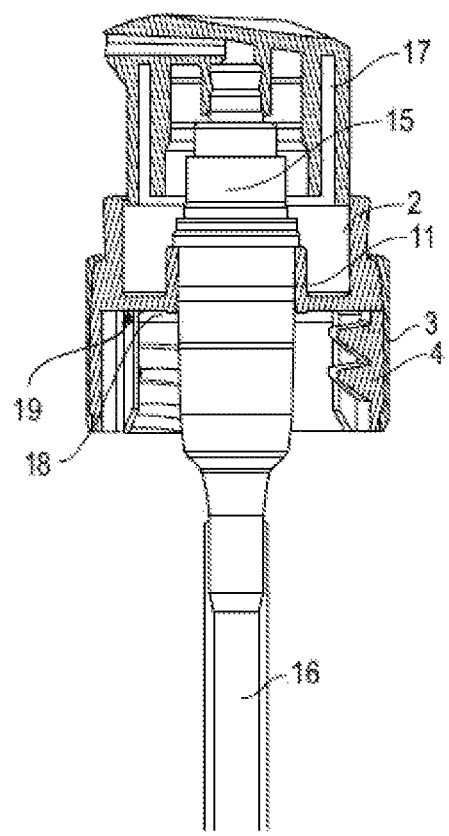
[Fig.10e]

FASTENING SYSTEM FOR A DISTRIBUTION MEMBER ON A THREADED NECK OF A RESERVOIR

CROSS REFERENCE TO RELATED APPLICATIONS

This application claims priority under 35 U.S.C. § 119(a) to French patent application number 1906778, filed on Jun. 24, 2019, the entire teachings of which are incorporated herein by reference.

BACKGROUND OF THE INVENTION

Field of the Invention

The present invention relates to a fastening system for fastening a distribution member, such as a pump or a valve, on a reservoir neck to form a distributor for a fluid product.

Description of the Related Art

In a fastening system for fastening a distribution member, the distribution member can be actuated manually by the user using one or more fingers, so as to distribute fluid product in a metered form or not. Such distributors of fluid products are frequently used in the field of perfumery, cosmetics or pharmacy.

In the prior art, there are already fastening systems that include a fastening ring associated with a rigid collar engaged around the fastening ring. The ring generally includes a skirt intended to be engaged around the neck of the reservoir, this skirt including flexible fastening tabs intended to engage fastening with a suitable profile formed by the neck. In general, the neck has an upper annular edge under which the tabs snap fit. It is common to use the rigid collar to push the fastening tabs against the suitable profile of the neck.

When the neck has an external threading, without a snap-fitting edge, it is then known to use a rigid ring, the skirt of which has an internal threading. The ring can then be screwed onto the neck of the reservoir, and unscrewed. The disadvantage with this type of ring is the complexity in its manufacture. Indeed, after the moulding of such a ring, the demoulding has two features:
a) a rotation of the mould to unscrew the ring, which is complicated to set up from a kinematic standpoint;
b) the observing of a waiting time before this demoulding by rotation such that the ring cools and the threading hardens, otherwise the threading can be damaged during demoulding.

These two features lead to an increase in the injection cycle time and therefore in the cost of the ring.

It is also known to use a ring, the internal surface of which is smooth and designed in a softer material that can be plastically deformed against the threading of the neck of the reservoir during the mounting of the ring on the neck by an action of screwing. In this case, the external threading "bites" in the ring and the latter has grooves after mounting. The initially smooth ring can be demoulded easily. However, the resistance of the ring on the neck of the reservoir after mounting is not as effective as if the ring had a true internal threading provided for this purpose initially. In addition, this plastic deformation with the grooves is not designed to resist several screwings and unscrewings of the ring on the neck.

BRIEF SUMMARY OF THE INVENTION

In the scope of the present invention, the fluid product distributor can be disassembled: the fastening system can be removed from the neck by unscrewing. Thus, the user can directly access the content of the reservoir, for example to collect the remainder of the fluid product, in particular when it is a cream. The disassembly capacity of the distributor can also be advantageous for the purposes of recycling.

The present invention aims to overcome the various disadvantages mentioned above, by means of a fastening system that can be screwed on a neck that has an external threading, including a ring that has a true internal threading to ensure a reliable and effective assembly and disassembly of the ring with respect to the neck, and that can easily be moulded and demoulded, with a minimum cycle time.

This purpose is achieved thanks to a fastening system for fastening a distribution member, such as a pump, on a neck of a reservoir to form a distributor for a fluid product, the distributor able to be disassembled by withdrawing the fastening system from the neck, the system including conventionally a fastening ring and a rigid collar, the ring including a skirt intended to be engaged around the neck, this skirt including articulated fastening tabs angled outwards with respect to a central axis X of the ring, the collar being able to be moved with respect to the skirt and engaged around the skirt so as to fold back the articulated tabs to their radial alignment with the axis X.

This fastening system is mainly characterised in that the ring with the collar is:
 able to be assembled on the neck without relative movement between the ring and the collar;
 and able to be disassembled from the neck without relative movement between the ring and the collar,
 and in that the articulated tabs have an internal fastening means that can engage with an external fastening means of the neck.

The main idea of this invention consists of providing articulated tabs at the skirt, with an internal threading, so as to be able to lift them and fold them back as desired, i.e. change their orientation according to the situation. For the situation of the demoulding of the ring, it is sufficient to raise the tabs outwards to space them from the mould and thus immediately demould the ring via one single translational movement of the mould. For the situation of the screwing on the neck of a reservoir, it is sufficient to fold back the tabs inwards such that they form a threaded skirt by angular range, which does not give rise to any particular problem in terms of reliability of the screwing.

The term radial alignment means an alignment of the tabs with respect to the axis X, which means that that the entire tab is at an equal distance from the axis X. The distance between a first end of the articulated tab (at the articulation) and the axis X is equal to the distance between a second end of the articulated tab (free, opposite the first end) and the axis X. The tabs are therefore deployed parallel to the axis X.

According to the different embodiments of the invention, which can be taken together or separately:
 the ring includes an upper portion surmounting the skirt, each articulated tab being connected to this upper portion via a hinge.
 the skirt include means for radially blocking articulated tabs limiting the folding back of the articulated tabs towards the inside of the skirt.
 the means for radially blocking articulated tabs consist of fixed tabs rigidly connected to the upper portion.
 the skirt includes several angular sectors formed from an alternation between the articulated tabs and the fixed tabs.

the fixed tabs have lateral edges against which lateral edges of the articulated tabs come into contact via friction.

the articulated tabs have an enlargement at the height of which the lateral edges of the articulated tabs rub against the lateral edges of the fixed tabs.

the enlargement is preferably located at the free end of the articulated tabs.

the fixed tabs have axial ribs that are developed along their lateral edges.

the articulated tabs are forcefully folded back between the axial ribs of the fixed tabs.

the hinges of the articulated tabs consist of film hinges.

the ring is formed in a single piece.

the internal fastening means of the articulated tabs consist of an internal thread and the external fastening means of the neck consist of an external thread, the articulated tabs being able to be screwed on the neck.

The invention also relates to a fluid product distributor including a reservoir of fluid product including a threaded neck, a distribution member, such as a pump, and a fastening system such as described above, wherein the fastening system is screwed to the threaded neck.

And finally, the invention relates to a method for manufacturing a ring of a fastening system for fastening a distribution member, such as a pump, on a neck of a reservoir to form a distributor for a fluid product, the ring having a central axis X and including a skirt intended to be engaged around the neck, this skirt including articulated fastening tabs having an internal fastening means that can engage with an external fastening means of the neck, the method including the following steps:

moulding of the ring on a core with the articulated tabs in the angled position with respect to the central axis and directed towards the outside of the skirt;

lifting of the articulated tabs until their disengagement with respect to the core;

demoulding of the ring with one single straight translational movement.

The lifting and the demoulding is achieved by means of an ejector. In the absence of such a tool, the demoulding is achieved by force. In this case, the ring is demoulded with its tabs at the same time, without having to lift them beforehand. The steps of the manufacturing method are therefore as follows:

moulding of the ring on a core with the articulated tabs in the angled position with respect to the central axis and directed towards the outside of the skirt;

demoulding of the ring with its articulated tabs with one single straight translational movement.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a perspective view of a fastening ring according to the invention;

FIG. 2 is a bottom view in perspective of the ring;

FIG. 3 is a top view in perspective of the ring;

FIG. 4 is a bottom view of the ring;

FIG. 5 shows the moulding of the ring on a core;

FIG. 6 is a cross-sectional view of a fastening system including a collar and of a ring, the collar being pre-mounted on the ring;

FIG. 7 is a cross-sectional view of a fastening system including a collar and of a ring, the collar being mounted on the ring;

FIG. 8 is a perspective view of a fastening system where the collar is mounted on the ring;

FIG. 9 is a perspective and cross-sectional view of the lower portion of the ring when it is ready to be mounted on the neck of a reservoir;

FIG. 10a is a cross-sectional view of a ring after having been demoulded, wherein a seal is inserted;

FIG. 10b is a cross-sectional view of the ring according to FIG. 10a, wherein a pump body is mounted;

FIG. 10c is a cross-sectional view of the ring and of the pump body according to FIG. 10b, a collar being mounted on the ring;

FIG. 10d is a cross-sectional view of the ring, of the pump body and of the collar according to FIG. 10c, a suction tube being mounted on the pump body;

FIG. 10e is a cross-sectional view of the ring, of the pump body, of the collar, and of the suction tube according to FIG. 10d, with a push-button being mounted on the pump body.

DETAILED DESCRIPTION OF THE INVENTION

Reference will be made first of all to FIG. 10e to describe in detail a non-limiting embodiment of a fastening system 1 of the invention. This fastening system 1 includes a fastening ring 2 associated with a rigid collar 3 which is intended to engage with radial clamping around the fastening ring 2, as will be seen below. The fastening ring 2 can be achieved by injection moulding of suitable plastic materials. As for the rigid collar 3, it can also be made of plastic material, but more preferably it is formed in metal, so as to provide distributors with aesthetic appeal. The fastening system 1 thus formed by the ring 2 and the collar 3 is used for the fastening of a distribution member 15 such as a pump or a valve, on a reservoir neck (not shown) so as to form a fluid product distributor. The fastening system 1 has a dual function, namely a fastening function, but also a sealing function. Thus, the fluid product stored in the reservoir can be extracted only through the distribution member.

The fastening ring 2 includes means for receiving the distribution member 15. The means for receiving can, for example, have the form of an annular housing 11 for snap-fitting wherein the distribution member 15 is received. This annular housing 11 defines an axial opening that allows the distribution member 15 to pass through the ring 2.

The distribution member 15 can consist of a pump body 15 engaged in the means for receiving. At its lower end, the pump body 15 forms an inlet of fluid product provided with a dip tube 16. At its upper end, the pump body 15 forms an outlet of fluid product provided with a push-button 17 used to actuate the pump.

Externally to the means for receiving, the ring 2 forms an annular plateau 19 that is positioned on the annular edge of the neck of the reservoir, with an optional interposition of an annular neck seal 18.

Finally, the fastening ring 2 externally forms a skirt which is formed discontinuously in its lower portion, thus forming fastening tabs.

These fastening tabs extend freely downwards and internally form a profile intended to engage with an external threading of the neck of the reservoir.

More specifically, the ring 2 is shown in particular in FIGS. 1 to 4. The ring 2 has a central axis X.

The skirt of the ring 2 includes angular sectors with two structures of alternating tabs.

The first tab structure is flexible and articulated by a hinge 20 to the upper portion 10 of the ring 2, formed of a cylindrical peripheral wall. These tabs are called "articulated tabs 4". They include an internal threading 5.

The second tab structure is rigidly connected to the upper portion 10 of the ring 2, and oriented according to the axis of the ring 2 and does not include any internal thread. These tabs are called "fixed tabs 6".

This skirt is thus formed from a succession of threaded articulated tabs 4 and smooth fixed tabs 6. There is an alternation between the two types of tabs.

In the example shown in the figures, there are three articulated tabs 4 alternating with three fixed tabs 6. However, any other number of articulated tabs 4 and of fixed tabs 6 can be considered. There are as many articulated tabs 4 as there are fixed tabs 6.

In the end, the skirt has an internal threading 5 per angular range. This type of threading by angular range is sufficient in terms of reliability of screwing such that the fastening system 1 is correctly screwed on the neck of the reservoir. The articulated tabs 4 thus engage with the external threading of the neck of the reservoir.

Preferably, the hinges 20 connecting the articulated tabs 4 to the upper portion of the ring 2 are of the film hinge 20 type, such that the tabs and the upper portion of the ring 2 come from the same material. The ring 2 then consists of one single moulded piece.

The moulding of the ring 2 is more specifically illustrated in FIG. 5.

The mould includes a core 12. This core 12 has a peripheral perimeter with angled walls 12a and vertical walls 12b which will be the reflection respectively of the articulated tabs 4 and of the fixed tabs 6 of the ring 2. The angled walls 12a have an external threading which thus allows to obtain the moulding of the internal threading 5 of the articulated tabs 4. Once the ring 2 is moulded on this core 12, it is sufficient to lift the various articulated tabs 4 upwards, i.e. to release them in relation to the core 12 by pivoting them around the film hinge 20, such that they are no longer engaged with the core 12. This lifting of the articulated tabs 4 is carried out via a forced withdrawal from the mould, or via a part termed "ejector". Thus, only the smooth and rigid surfaces of the ring 2 remain in contact with the core 12 and it is then possible to remove the core 12 simply with respect to the ring 2 via a straight translational movement to obtain the demoulding of the ring 2. Thus, the smooth and rigid surfaces slide along the core 12.

Preferably, the ring 2 is demoulded by axial displacement of the core, i.e. of the mould.

To demould the ring 2, it is therefore no longer necessary to wait until the threading has fully hardened. The core 12 can be separated from the ring 2 soon after injection. The cooling time is typically divided by two, which greatly reduces the cycle time. In addition, the demoulding is facilitated since it consists only of a straight translational movement which is from a kinetic standpoint clearly easier to carry out than a demoulding via rotation as in the prior art for unscrewing the core 12 with respect to the ring 2.

It must be noted that the articulated tabs 4 can be moulded flat, therefore perpendicularly to the fixed tabs 6. The walls 12a are then angled 90° with respect to the axis X of the ring 2.

The ring 2 thus obtained after moulding has a plurality of fixed tabs 6 oriented according to the axis X of the ring 2, and a plurality of articulated tabs 4 angled with respect to the axis X of the ring 2 and directed outwards, as can be seen easily in FIGS. 1 to 4.

During the assembly of the fastening system 1, the collar 3, consisting of a cylindrical revolution part, is first prepositioned on the ring 2 at its upper portion 10, i.e. upstream from the skirt, as is shown in FIG. 6. In this case, the articulated tabs 4 are still angled outwards. When the collar 3 is force fitted around the ring 2, little by little it folds back the articulated tabs 4 towards the inside of the ring 2 until the articulated tabs 4 are radially aligned with the fixed tabs 6. In this case, the fixed tabs 6 and the articulated tabs 4 are coaxial with respect to the axis X and form a cylindrical skirt of axis X, as shown in FIGS. 7 and 8. The fastening system 1 is then ready to be screwed on a reservoir neck that has an external threading. It can also be unscrewed, without there being any relative movement between the collar 3 and the ring 2.

During the folding back of the articulated tabs 4 by the collar 3, it is possible that the pivoting of the articulated tabs 4 does not stop exactly in the radial alignment of the fixed tabs 6, and that the articulated tabs 4 go farther and are angled towards the inside of the ring 2, according to the suppleness and flexibility of the film hinge 20.

It is therefore necessary that the articulated tabs 4 be limited in their radial displacement inwards, otherwise the opening between the threaded articulated tabs 4 would be too limited and moreover undefined, and the fastening system 1 therefore could not be mounted on the threaded neck of a reservoir.

For this purpose, the fixed tabs 6 are used as a means of radial blocking of the articulated tabs 4 limiting the folding back of the articulated tabs 4 towards the inside of the skirt. More specifically, it is the dimensioning between the fixed tabs 6 and the articulated tabs 4 that will allow for the limitation. The fixed tabs 6 have lateral edges 8 against which the lateral edges 9 of the articulated tabs 4 come into contact via friction. Also, during the folding back of the articulated tabs 4 by the mounting of the aesthetic collar 3, the lateral edges 9 of the articulated tabs 4 are force fitted between the lateral edges 8 of the fixed tabs 6. To further increase this force fitting, the articulated tabs 4 have an enlargement, and the friction between the articulated tabs 4 and the fixed tabs 6 is produced in particular at this enlargement. Preferably, the enlargement is located at the free end of the articulated tabs 4, therefore in the lower portion of the articulated tabs 4.

Even more preferably, the articulated tabs 4 have a flared shape towards their free end, and therefore have a maximum width at the free end thereof. In this case, the maximum friction between the articulated tabs 4 and the fixed tabs 6 will take place at the lower portions of the lateral edges 9, 8 of the articulated tabs 4 and of the fixed tabs 6.

Another risk would be that the friction zone 13 does not have sufficient travel for the articulated tabs 4 to be able to be stopped in time before being excessively folded back towards the inside of the ring 2. To respond to this problem, axial ribs 7 radially extending inwards are provided along lateral edges 8 of the fixed tabs 6. These ribs 7 have a more substantial radial friction surface that therefore allows to increase the friction path between the articulated tabs 4 and the fixed tabs 6 and which prevent the pivoting of the articulated tabs 4 in an entirely reliable and effective manner. In other terms, these ribs 7 increase the thickness of the fixed tabs 6 at their lateral edges 8.

They also make it possible to reinforce the lateral edges 8 of the fixed tabs 6.

Thus, during the folding back of the articulated tabs 4 by mounting the aesthetic collar 3, the lower portion of the lateral edges 9 of the articulated tabs 4 is forcibly mounted against the ribs 7 of the fixed tabs 6 and their radial position is sufficiently well-defined such that the whole can then be automatically screwed on the threaded neck of a bottle. In FIGS. 8 and 9, it is easy to see that the articulated tabs 4 have a flared shape, and that there is no friction at the upper portion of the lateral edges 8, 9, since there is a free space 14 between the articulated tabs 4 and the fixed tabs 6, and that there is a friction zone 13 at the lower portion of the lateral edges 9, 8 between the articulated tabs 4 the fixed tabs 6.

The ribs moreover allow to centre the ring on the neck of the reservoir (not shown).

FIGS. 10a to 10e show the different steps of mounting the fastening system 1 with a distribution member.

In FIG. 10a the ring 2 is demoulded and its articulated tabs 4 are in a position angled outwards. A seal 18 is inserted inside the ring 2 and is thrust against the annular plateau 19.

In FIG. 10b a pump body 15 is inserted inside the annular housing 11 of the ring 2.

In FIG. 10c the collar 3 is positioned around the ring 2 and folds back the various articulated tabs 4 such that the skirt of the ring 2 has a cylindrical appearance, such that the articulated tabs 4 and the fixed tabs 6 are all radially aligned.

In FIG. 10d a dip tube 16 is inserted at the inlet of the pump body 15.

In FIG. 10e a push-button 17 is inserted at the outlet of the pump body 15.

The configurations shown in the figures mentioned are only possible examples, in no way limiting, of the invention which encompasses on the contrary alternative forms and designs within the scope of a person skilled in the art.

Of note, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", and/or "including," when used in this specification, specify the presence of stated features, integers, steps, operations, elements, and/or components, but do not preclude the presence or addition of one or more other features, integers, steps, operations, elements, components, and/or groups thereof.

As well, the corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A fastening system for fastening a distribution member to a reservoir, the fastening system comprising:
    a fastening ring comprising:
        a central axis; and
        a skirt, comprising:
            fixed tabs; and
            articulated tabs angled outwards with respect to the central axis; and
    a rigid collar, moveably engaged around at least a portion of the skirt, wherein movement of the rigid collar relative to the skirt frictionally engages the articulated tabs with the fixed tabs.

2. The fastening system of claim 1, wherein the fastening ring further comprises an upper portion surmounting the skirt, and wherein each articulated tab is connected to the upper portion via a hinge.

3. The fastening system of claim 1, wherein the skirt comprises angular sectors formed between said articulated tabs and said fixed tabs when frictionally engaged.

4. The fastening system of claim 3, wherein the fixed tabs further comprise lateral edges against which the articulated tabs come into contact via friction as the rigid collar engages the articulated tabs.

5. The fastening system of claim 4, wherein the articulated tabs further comprise an enlargement at a free end of the articulated tabs, wherein the enlargement rubs against the lateral edges of the fixed tabs.

6. The fastening system of claim 3, wherein the fixed tabs further comprise axial ribs along the lateral edges.

7. The fastening system of claim 6, wherein movement of the rigid collar towards the skirt moves the articulated tabs towards the axial ribs of the fixed tabs.

8. The fastening system of claim 1, wherein the fastening ring is a single piece.

9. The fastening system of claim 1, wherein the articulated tabs further comprise an internal thread.

10. A fluid product distributor, comprising:
    a reservoir for fluid product comprising a neck;
    a pump; and
    a fastening system connected to the neck, the fastening system comprising:
        a fastening ring comprising a skirt engaged around the neck, the skirt comprising articulated fastening tabs and fixed tabs;
    a rigid collar engaged around the skirt so as to fold back the articulated fastening tabs to frictionally engage the fixed tabs.

11. A fastening system, comprising:
    a fastening ring, comprising:
        an annular plateau;
        an upper portion extending away from the annular plateau in a first direction;
        a skirt extending away from the annular plateau in a second direction opposite the first direction, the skirt comprising:

at least one articulated tab comprising a thread on an internal surface of the at least one articulated tab; and at least one fixed tab, each of the at least one fixed tabs comprising:

a pair of opposite lateral edges;

an axial rib running along each of the pair of lateral edges and extending radially inward; and a rigid collar attached to the upper portion of the fastening ring in a position to be downwardly moved over the skirt, wherein said downwardly movement moves the at least one fixed tab to create frictional engagement between at least one articulated tab and at least one fixed tab.

12. The fastening system of claim 11, further comprising a hinge connecting each of said at least one articulated tabs to the upper portion of the fastening ring.

13. The fastening system of claim 11, wherein the at least one fixed tab is smooth.

14. The fastening system of claim 11, wherein the at least one articulated tab comprises three articulated tabs and the at least one fixed tab comprises three fixed tabs.

15. The fastening system of claim 11, further comprising:

a reservoir comprising a threaded neck;

a distribution member attached to the fastening ring and extending at least partially into the reservoir; and wherein the fastening ring is seated on the threaded neck of the reservoir, the rigid collar covers the skirt, and the at least one articulated tab is pressed against the threaded neck of the reservoir, wherein the thread on the internal surface of the at least one articulated tab mates with the threaded neck.

16. The fluid product dispenser of claim 10, wherein the skirt further comprises angular sectors formed between said articulated fastening tabs and said fixed tabs.

17. The fluid product dispenser of claim 10, wherein the fixed tabs further comprise lateral edges which frictionally engage the articulated fastening tabs.

18. The fluid product dispenser of claim 17, wherein the articulated fastening tabs further comprise an enlargement at a free end of the articulated fastening tabs, wherein the enlargement frictionally engages the lateral edges of the fixed tabs.

* * * * *